(12) United States Patent
Banasik

(10) Patent No.: US 11,358,800 B2
(45) Date of Patent: Jun. 14, 2022

(54) STANDARDIZED MODULAR DRIVE ASSEMBLY

(71) Applicant: SEW-EURODRIVE GMBH & CO. KG, Bruchsal (DE)

(72) Inventor: Lech Banasik, Brighton East (AU)

(73) Assignee: SEW-EURODRIVE GmbH & Co. KG, Bruchsal (DE)

( * ) Notice: Subject to any disclaimer, the term of this patent is extended or adjusted under 35 U.S.C. 154(b) by 0 days.

(21) Appl. No.: 17/054,072

(22) PCT Filed: Apr. 25, 2019

(86) PCT No.: PCT/EP2019/025129
§ 371 (c)(1),
(2) Date: Nov. 9, 2020

(87) PCT Pub. No.: WO2019/214846
PCT Pub. Date: Nov. 14, 2019

(65) Prior Publication Data
US 2021/0269248 A1    Sep. 2, 2021

(30) Foreign Application Priority Data

May 9, 2018 (AU) ................................ 2018901580

(51) Int. Cl.
*B65G 23/30* (2006.01)
*B65G 23/22* (2006.01)
*F16H 57/04* (2010.01)

(52) U.S. Cl.
CPC ............. *B65G 23/30* (2013.01); *B65G 23/22* (2013.01); *F16H 57/045* (2013.01); *F16H 57/0436* (2013.01); *B65G 2207/30* (2013.01)

(58) Field of Classification Search
CPC ........ B65G 23/00; B65G 23/22; B65G 23/24; B65G 23/26; B65G 23/30; F16H 57/045;
(Continued)

(56) References Cited

U.S. PATENT DOCUMENTS 2,596,794 A    5/1952   Schmitter
3,600,977 A *  8/1971   Bogie .................... B65G 23/00
                                                    475/343
(Continued)

FOREIGN PATENT DOCUMENTS

DE         2345935 A1 *  3/1975  ............. B65G 23/22
DE    102005031197 A1    1/2007
DE    102016001853 A1    9/2016

OTHER PUBLICATIONS

International Search Report issued in International Application No. PCT/EP2019/025129, dated Jul. 19, 2019, pp. 1-2, English Translation.

*Primary Examiner* — William R Harp
(74) *Attorney, Agent, or Firm* — Carter, DeLuca & Farrell LLP

(57) ABSTRACT

A standardized modular drive assembly includes: a gear unit module, which includes a gear unit mounted on a gear unit base plate, the gear unit having an output shaft which is adapted to be coupled with a conveyor device pulley shaft; and a motor module, which includes an electric motor mounted on a motor base plate, the motor base plate being able to be joined and connected to the gear unit base plate in an exchangeable manner, and the motor module having a torque link which is adapted to be coupled with a conveyor device support structure.

22 Claims, 20 Drawing Sheets

(58) Field of Classification Search
CPC .. F16H 57/0436; F16H 57/033; F16H 57/025; F16H 2057/005; F16H 2057/0335
USPC ................................................ 198/832, 835
See application file for complete search history.

(56) References Cited

U.S. PATENT DOCUMENTS

| | | | |
|---|---|---|---|
| 5,160,113 A | 11/1992 | Whiddon | |
| 7,942,078 B2 * | 5/2011 | Leimann | ............... F16H 57/025 |
| | | | 74/606 R |
| 9,260,250 B2 * | 2/2016 | Tamura | .................. B65G 23/22 |
| 10,151,422 B2 | 12/2018 | Lauer et al. | |
| 2007/0246634 A1 * | 10/2007 | Leimann | .................. F16M 7/00 |
| | | | 248/637 |

* cited by examiner

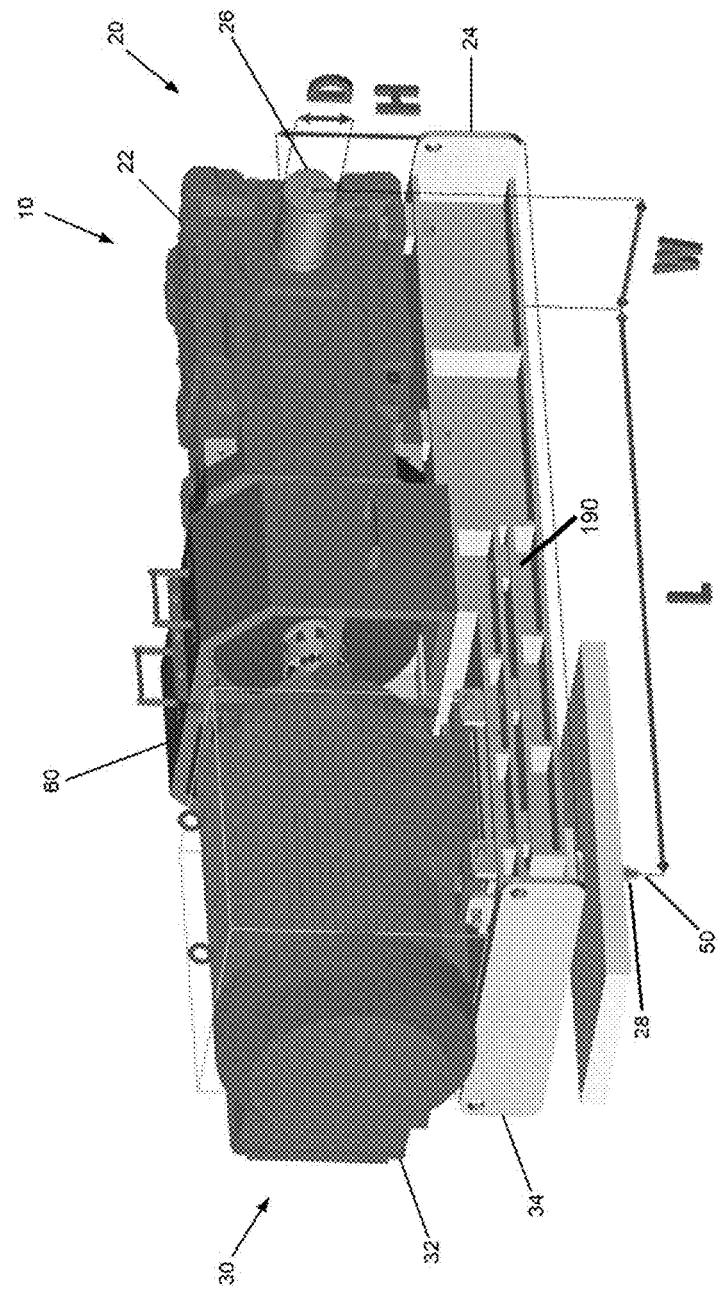

STANDARDIZED MODULAR DRIVE ASSEMBLY

FIELD OF THE INVENTION

The present invention relates to standardized modular drive assemblies, e.g., for industrial equipment such as conveyor devices.

BACKGROUND INFORMATION

Certain conventional drive assemblies for conveyor devices have an electric motor and a gear unit.

SUMMARY

Example embodiments of the present invention is based on the objective of making the production of a drive assembly economical and simple.

According to an example embodiment of the present invention, a drive assembly, e.g., a standardized and/or modular drive assembly, includes: a gear unit module, which includes a gear unit mounted on a gear unit base plate, the gear unit having an output shaft adapted to be coupled with a conveyor device pulley shaft; and a motor module, which includes an electric motor mounted on a motor base plate, the motor base plate being able to be joined and connected to the gear unit base plate in an exchangeable manner, and the motor module having a torque link, which is adapted to be coupled with a conveyor device support structure.

This has the advantage that the present invention is able to be used in drive assemblies for conveyor devices having an electric motor and a gear unit, which are connected by a coupling and are jointly mounted on a single-piece base plate.

In particular, example embodiments of the present invention may be used in drive assemblies for conveyor devices provided with supplementary components such as brakes, protection devices, and torque arms.

With the aid of the modular approach described herein, individual drive assemblies for conveyor devices having different customized specifications are able to be produced so that special customer requirements can be satisfied. Individual orders for customized drive assemblies for conveyor devices that require a high expenditure, high production costs and long lead times are able to be avoided according to the measures described herein.

Therefore, a high variance may be obtained while using a small number of parts, which means that an economical production is possible.

According to example embodiments of the present invention, a standardized modular drive assembly is provided, which has the following: a gear unit module, which includes a gear unit mounted on a gear unit base plate, the gear unit having an output shaft adapted to be coupled with a conveyor device pulley shaft; and a motor module, which includes an electric motor mounted on a motor base plate, the motor base plate being able to be joined and connected to the gear unit base plate in an exchangeable manner, and the motor module has a torque link, which is adapted to be coupled with a conveyor device support structure. The drive assembly may be defined by standardized interface measurements L, W, H and D, in which case: L represents a clearance between vertical planes perpendicular to the center of gravity line of the drive assembly through centers of the torque link and the output shaft; W represents a clearance between vertical planes perpendicular to the center of gravity line of the output shaft through a center of the torque link and an end face of the output shaft; H represents a clearance between vertical planes through the center of gravity line of the output shaft and the mounting surface of the torque link; and D represents a diameter of the output shaft of the gear unit.

The gear unit may be selected from a plurality of gear units, which have a plurality of corresponding standardized gear ratios.

The electric motor may be selected from a plurality of electric motors, which have a plurality of corresponding standardized dimensions.

In addition, the standardized modular drive assembly may include a brake, which is situated between a drive shaft of the electric motor and an input shaft of the gear unit.

The torque link may be selected from a plurality of torque links which have standardized dimensions.

The engine module may be joined and connected to the gear unit module in an exchangeable manner with the aid of partially overlapping, recessed, projecting parts of the gear unit base plate and the motor base plate.

The standardized modular drive assembly can be an angle drive system for a conveyor device or some other machine requiring an angle drive system.

According to example embodiments, drive assembly has a gear unit, a motor, in particular an electric motor, and a motor swing base. For example, the gear unit is directly driven by the motor or driven via a coupling, the motor swing base has a first and a second swing part, and the gear unit is fixed in place on the first swing part. The motor, for example, and the coupling is or are fixed in place on the second swing part, the first swing part, for example, having or being the gear unit base plate, and the second swing part having or being the motor base plate.

This has the advantage that the subdividing of the motor swing base and the thereby created interface allows for a modular configuration on the one hand, while a thermal, electrical and/or vibration-related decoupling of the gear unit from the motor is achievable on the other hand.

According to example embodiments, at least one pair of plate parts is situated between the first and the second swing part, the first plate part of the pair is connected to the first swing part, e.g., by welding, and the second plate part of the pair is connected to the second swing part, e.g., by welding. The contact surface between the first swing part and the second swing part is reduced to the contact surface of the plate parts, which means that a high pressure, i.e., weight force per area, is able to be generated. Since a very high normal force is therefore generated, a strong nonpositive connection is obtained. This is because the static friction thus generated in the axial direction is a function of the normal force related to the contact surfaces. The high pressure, however, causes a further increase in the static friction.

According to example embodiments, a connector such as a threaded rod or screw projects through a recess that passes through the pair, e.g., such that a nut and a screw head or a further nut press the two swing parts onto the respective pair. The first swing part is pushed toward the second swing part and a frictional connection is thus able to be induced between the first and the second swing part via the plate parts.

According to example embodiments, the plate parts, especially with the exception of the recess, are shaped in the form of a cuboid or wedge in each case. This offers the advantage that in the cuboidal configuration, an adaptation to the level of the motor in relation to the motor swing base relative to the gear unit is achievable through the dimensioning of the plate parts, and in the wedge-shaped configuration, an adjustment of this height is able to be performed by a displacement in the axial direction.

According to example embodiments, the plate parts are arranged as damping elements for damping vibrations. For example, each one of the plate parts includes a stack of individual sheets of metal coated with an elastic material. This has the advantage that the vibration modes generated by the motor are not transmitted to the gear unit. In the coupling, an intermediate part may be provided, which is made from plastic or has a plastic coating and is positioned between the input shaft of the gear unit and the rotor shaft of the motor and/or a coupling shaft of the coupling. The torque transmission from the motor to the gear unit thus takes place via this intermediate part, which acts as a damping element. However, the plate parts act as damping elements as well. As a result, an effective decoupling of the motor and gear unit is achievable with regard to vibrations.

According to example embodiments, the plate parts are arranged as electrical insulators, the plate parts electrically insulating the first swing part from the second swing part, for example, an electrical insulator being placed between the coupling and the input shaft of the gear unit, e.g., for the electrical insulation between the motor and the gear unit, for example, the plate parts being made from an electrically insulating material or having a coating made of an electrically insulating material. This is considered advantageous since it reduces corrosion. This is because charges that are created in the region of the rapidly rotating rotor shaft of the motor are kept away from the gear unit and corresponding electrical compensating currents in the region of the gear unit are thus avoided as well.

According to example embodiments, the region covered by the first swing part in the axial direction overlaps with the region covered by the second swing part in the axial direction or is encompassed by it, the region covered by the first swing part in the normal direction overlaps with the region covered by the second swing part in the normal direction or is encompassed by it, for example, the axial direction is parallel to the axis of rotation of the rotor shaft of the motor and/or parallel to the axis of rotation of the input shaft of the gear unit, for example, the normal direction being aligned in parallel with the normal of the plane including the pairs of plate parts, and/or the normal direction being aligned in parallel with the normal of the plane including the contact surface between the first and the second plate part of a respective pair. This has the advantage that the connection plane between the first and the second swing part is situated in the respective region covered by the first swing part in the normal direction and in the axial direction. This makes it possible to achieve greater stability.

According to example embodiments, the first swing part has an upper plate and a lower plate, which is aligned in parallel with the upper plate and set apart from the upper plate, a support plate is situated between the upper and the lower plate, and the support plate is connected to the upper and the lower plate, e.g., by welding, for example, front plates and/or webs are connected to the upper plate, the lower plate and the support plate in each case, e.g., by welding. This offers the advantage that the second swing part has very high stiffness.

According to example embodiments, the first swing part has a cavity, which is at least partially filled with transmission oil, and an oil line leads from the cavity to the interior space of the gear unit, e.g., via a pump, and an oil line leads from the interior space of the gear unit to the cavity, the plate parts being arranged as a thermal barrier, e.g., so that the heat flow generated by the motor is able to be spread out with the aid of the second swing part but is kept away from the first swing part. This offers the advantage of a better heat dissipation so that the drive assembly generates the greatest possible output while featuring a compact configuration.

According to example embodiments, the second swing part has an upper plate and a lower plate, which is aligned in parallel with the upper plate and set apart from the upper plate, a support plate is situated between the upper and the lower plate, and the support plate is connected to the upper and the lower plate, e.g., by welding, for example, the front plates and/or the webs being connected to the upper plate, the lower plate and the support plate in each case, e.g., by welding. This offers the advantage that the second swing part has very high stiffness.

According to an example embodiment of the present invention, a conveyor device includes a previously mentioned drive assembly. This offers the advantage that because of the modular configuration, a combination of motor and gear unit that is adapted to the requirements of the load to be driven by the drive assembly is able to be used.

Further features and aspects of example embodiments of the present invention are described in greater detail below with reference to the appended schematic Figures.

BRIEF DESCRIPTION OF THE DRAWINGS

FIGS. 1 and 1A are perspective views of a standardized modular drive assembly according to an exemplary embodiment of the present invention.

DETAILED DESCRIPTION

Figure 1:
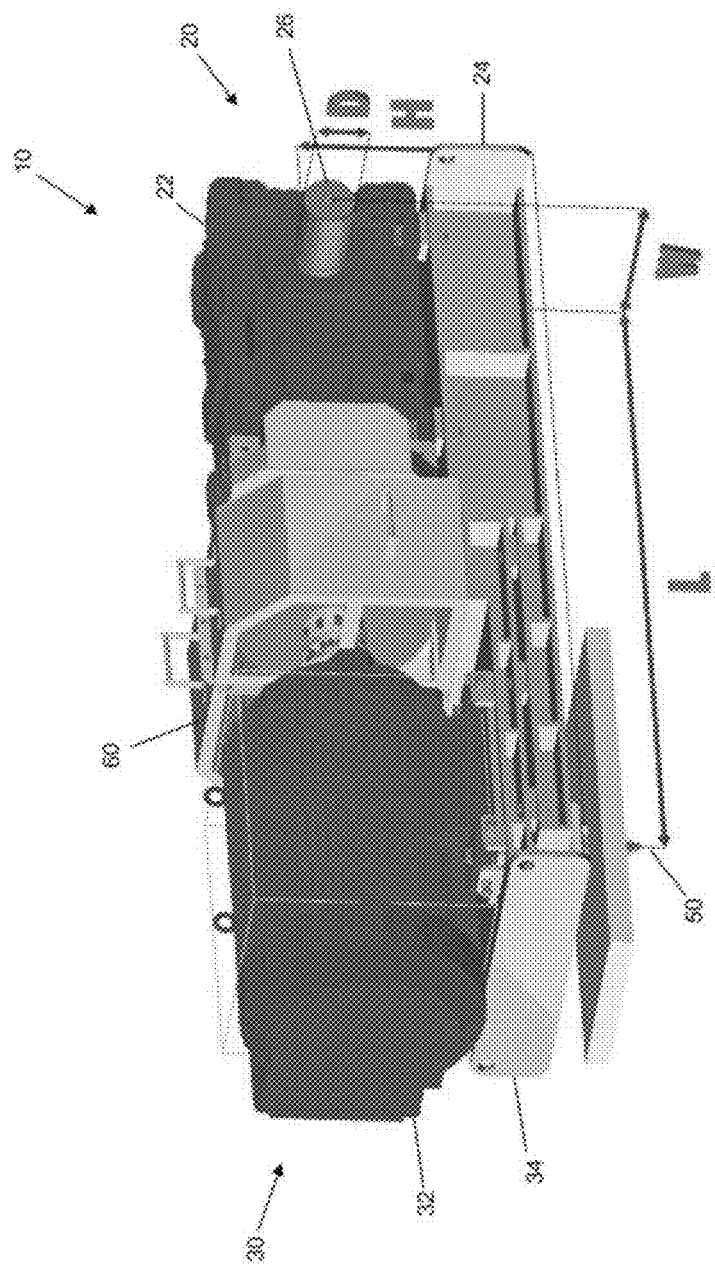
Figure 2:
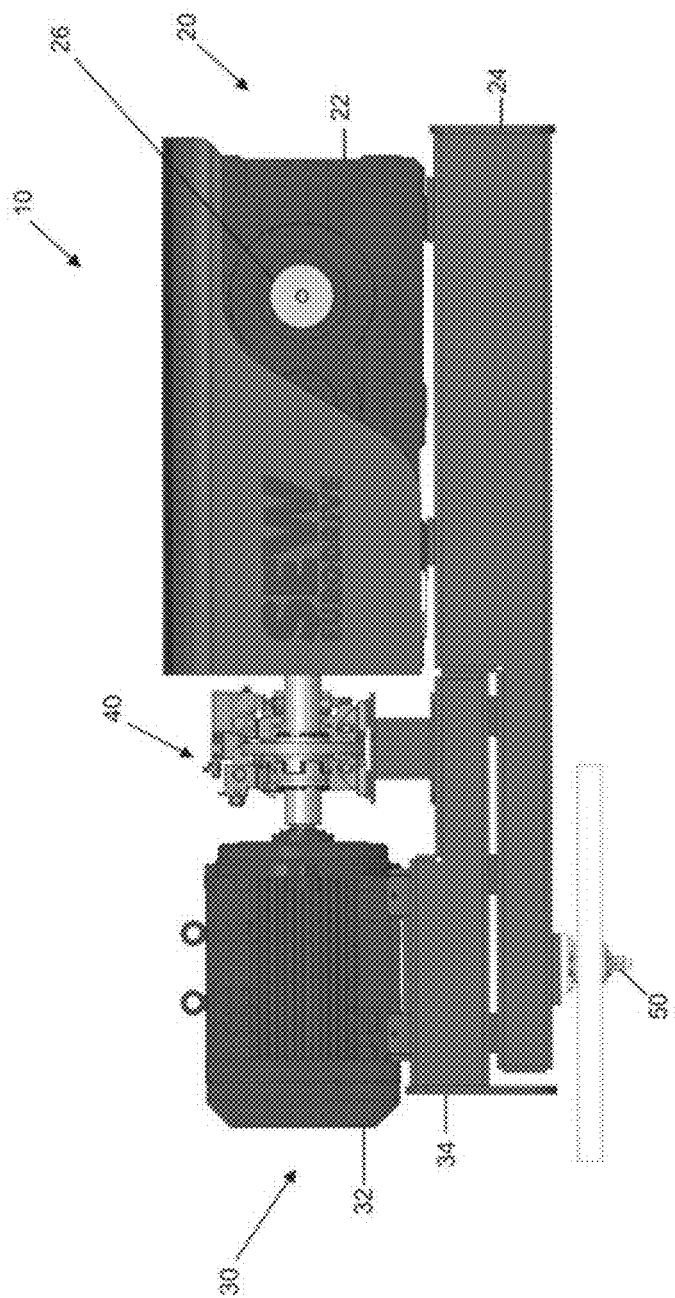
FIGS. 2, 2A, 3, and 3A are side views of standardized modular drive assemblies according to exemplary embodiments of the present invention.
Figure 2A:
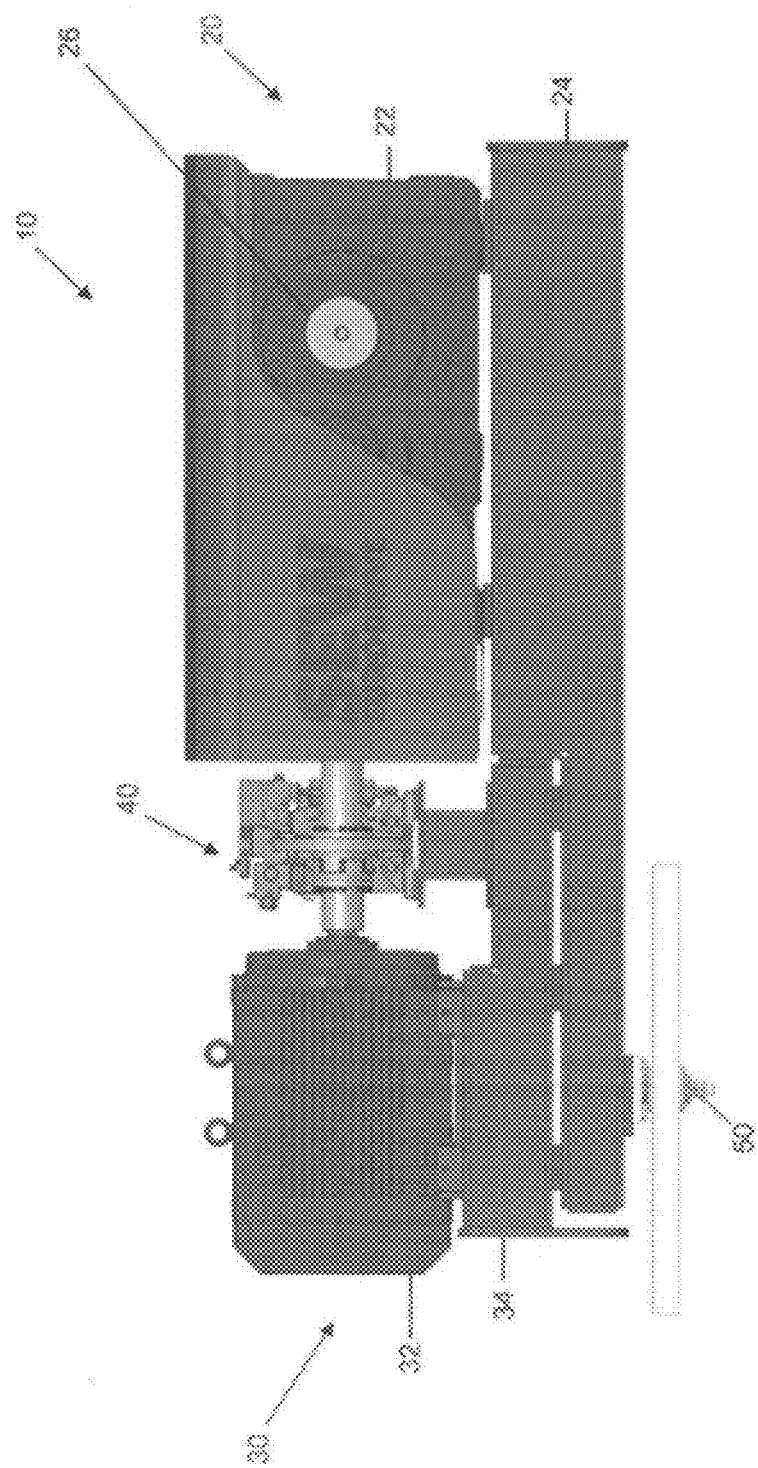
Figure 3:
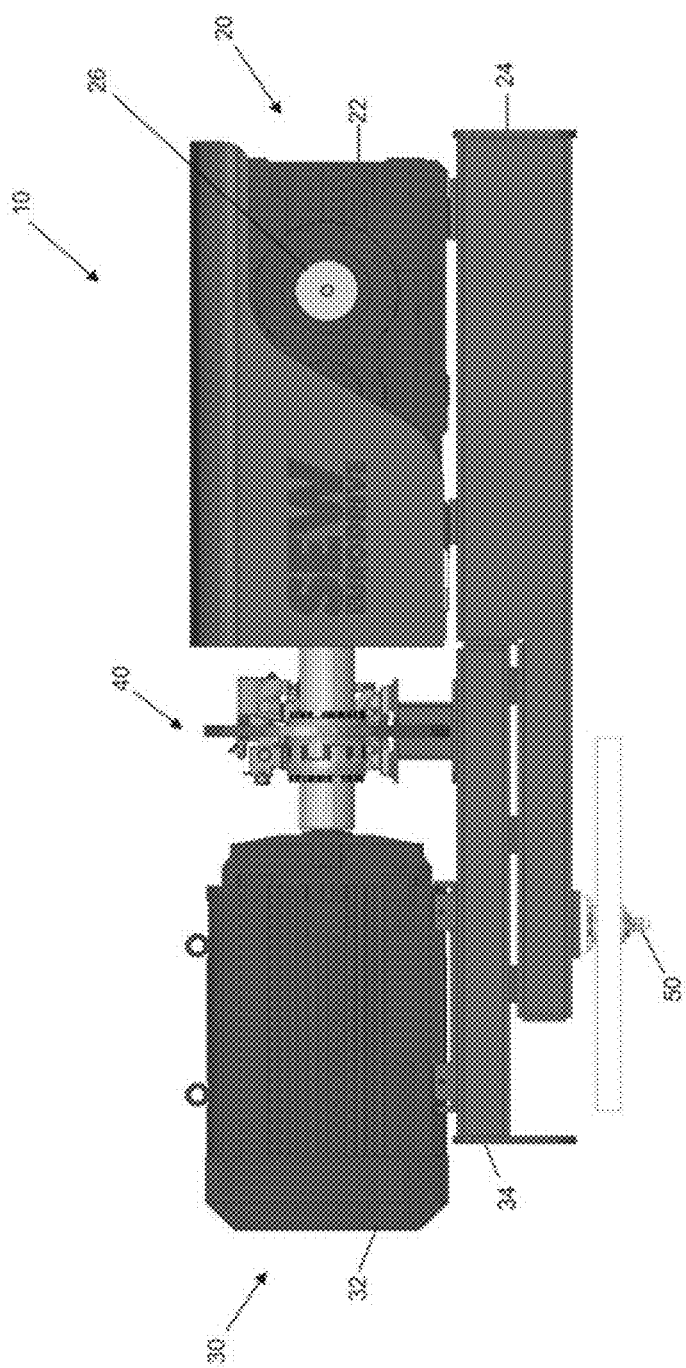
Figure 3A:
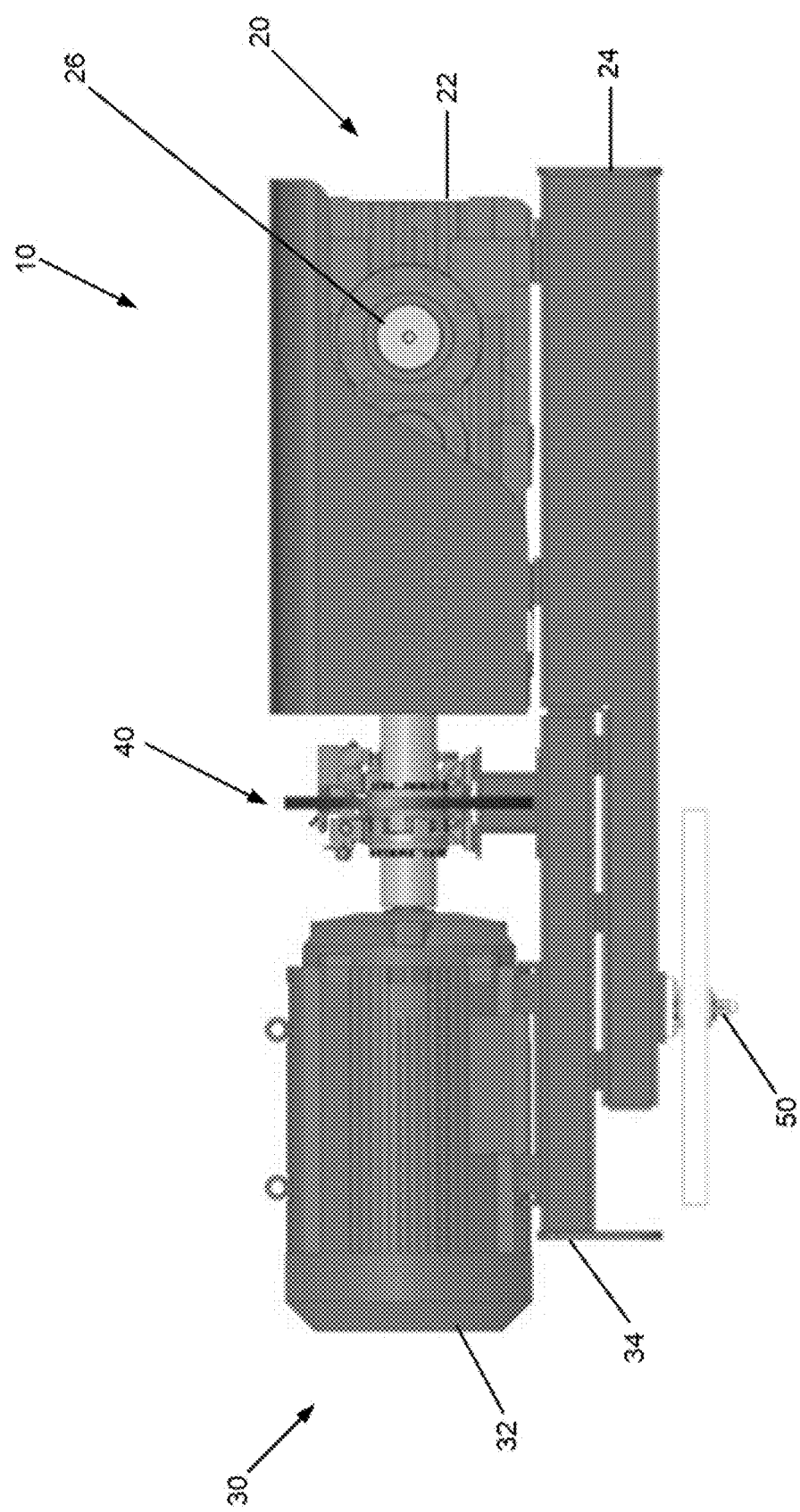
Figure 4:
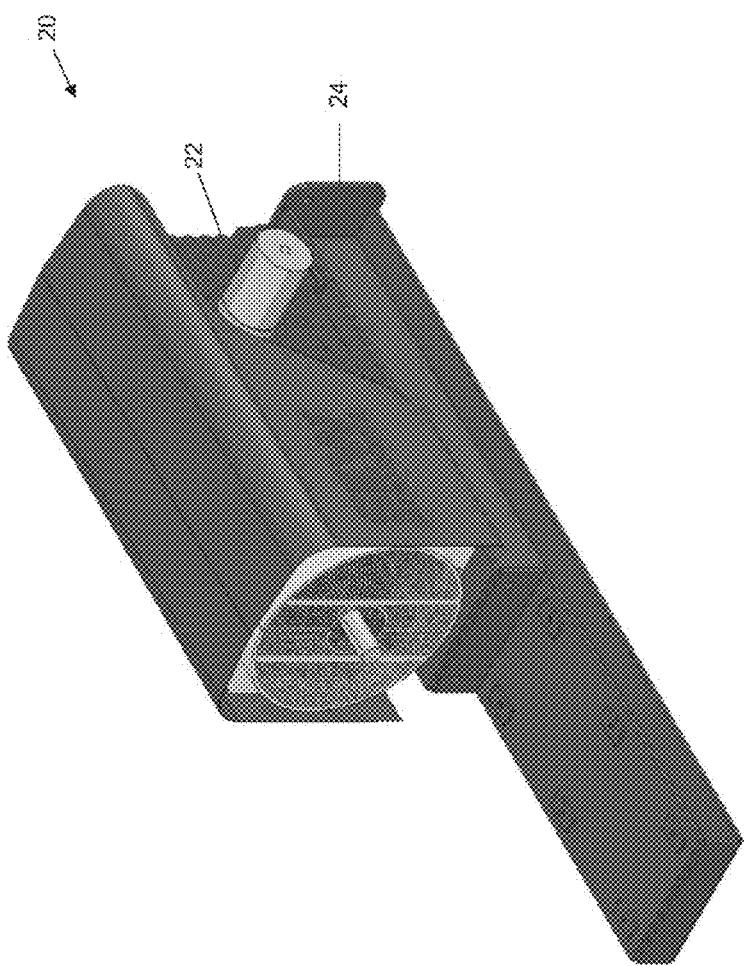
FIGS. 4 and 4A are perspective views of a motor module, which is able to be implemented in the standardized modular drive assemblies illustrated in FIGS. 2, 2A, 3, and 3A.
Figure 4A:
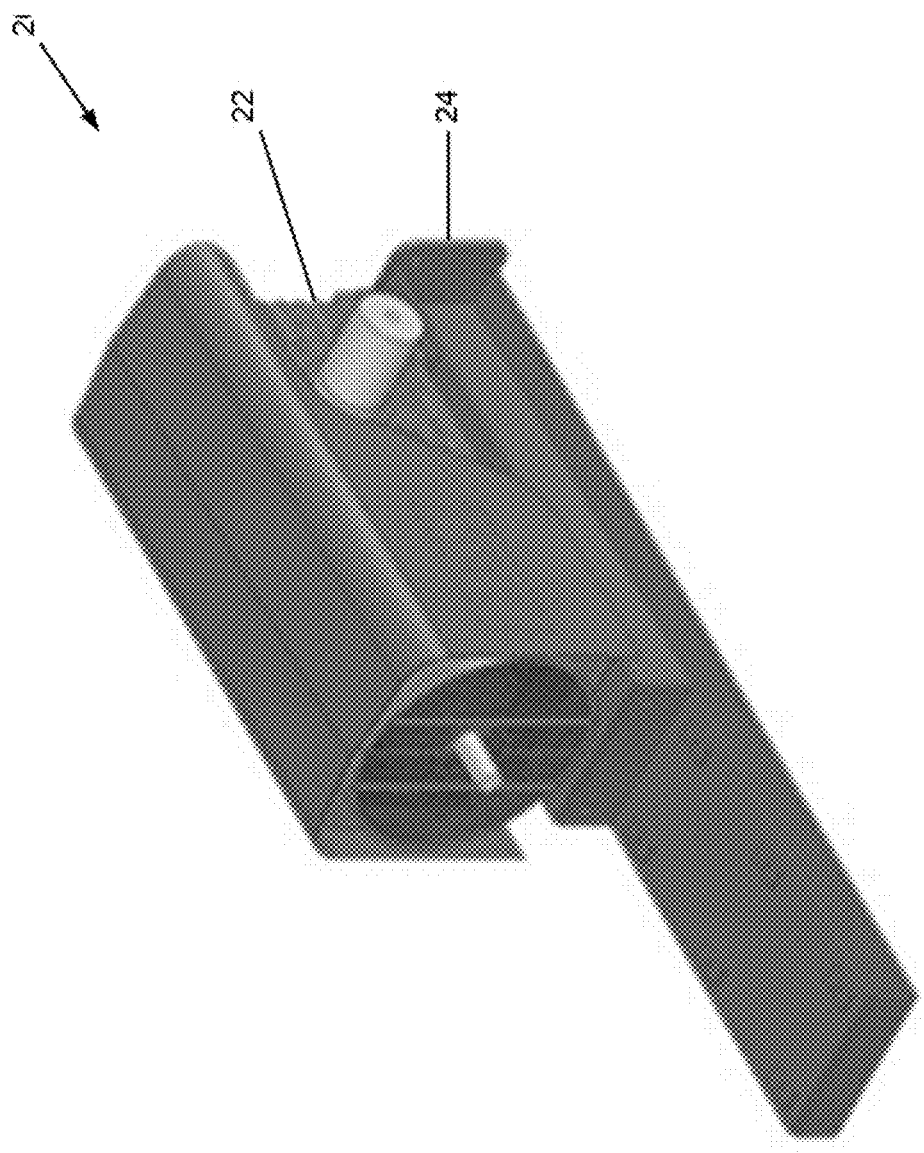
Figure 5:
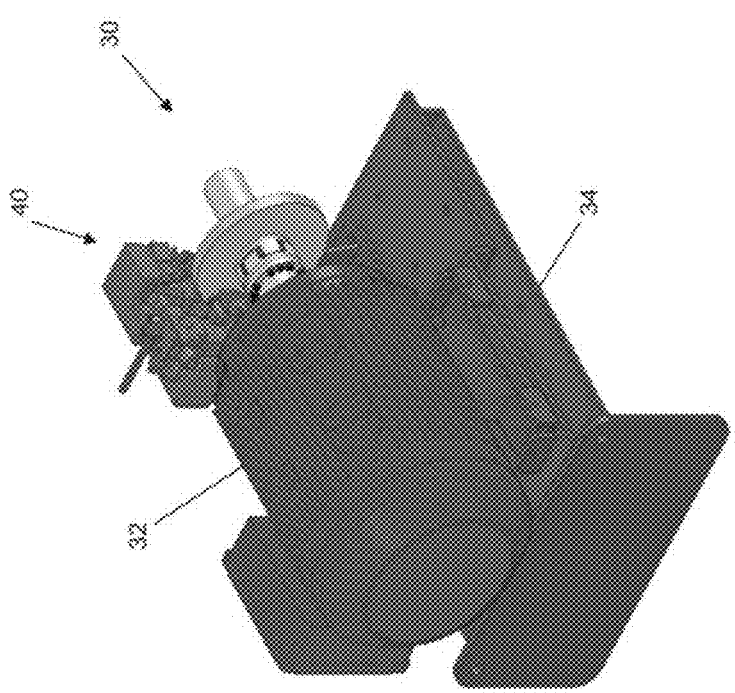
FIGS. 5 and 5A are perspective views of a gear unit module, which is able to be implemented in standardized modular drive assemblies illustrated in FIGS. 2, 2A, 3, and 3A.
Figure 5A:
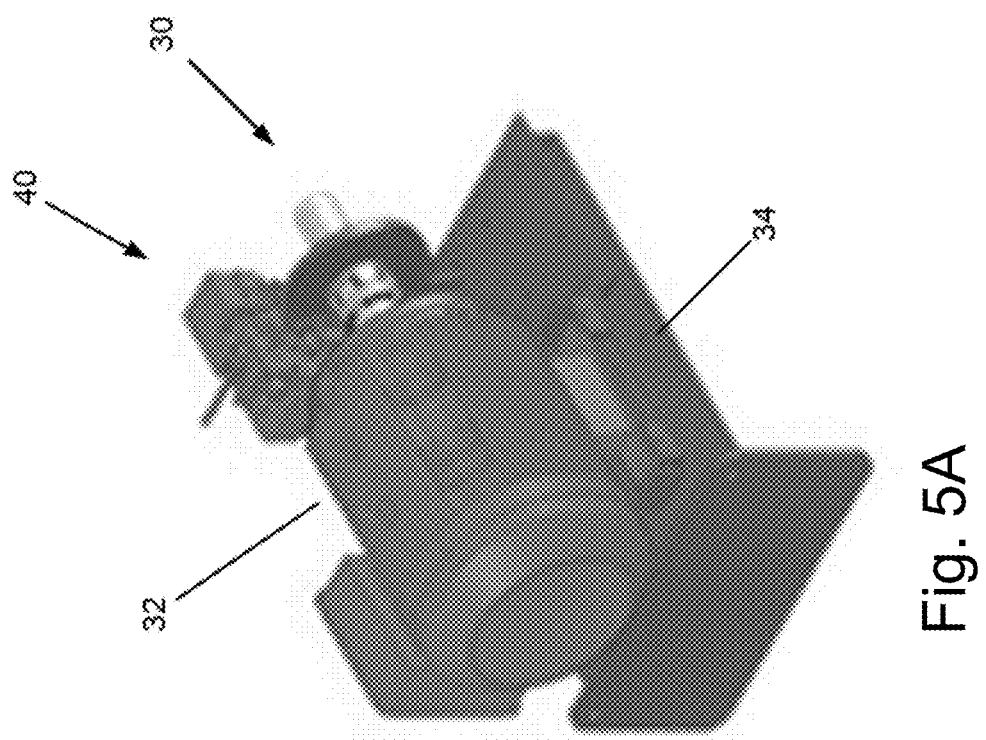
Figure 6:
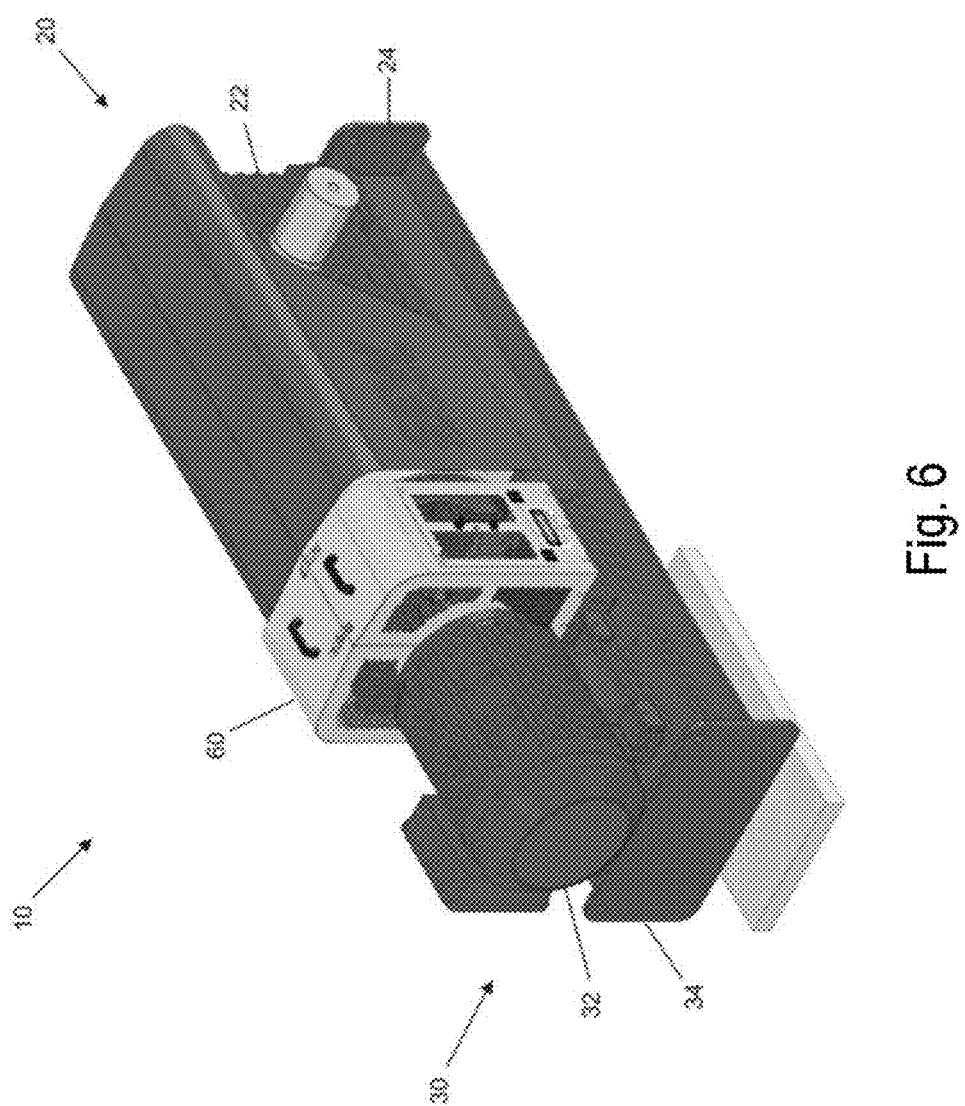
FIGS. 6 and 6A are perspective views of an assembled standardized modular drive assembly.
Figure 6A:
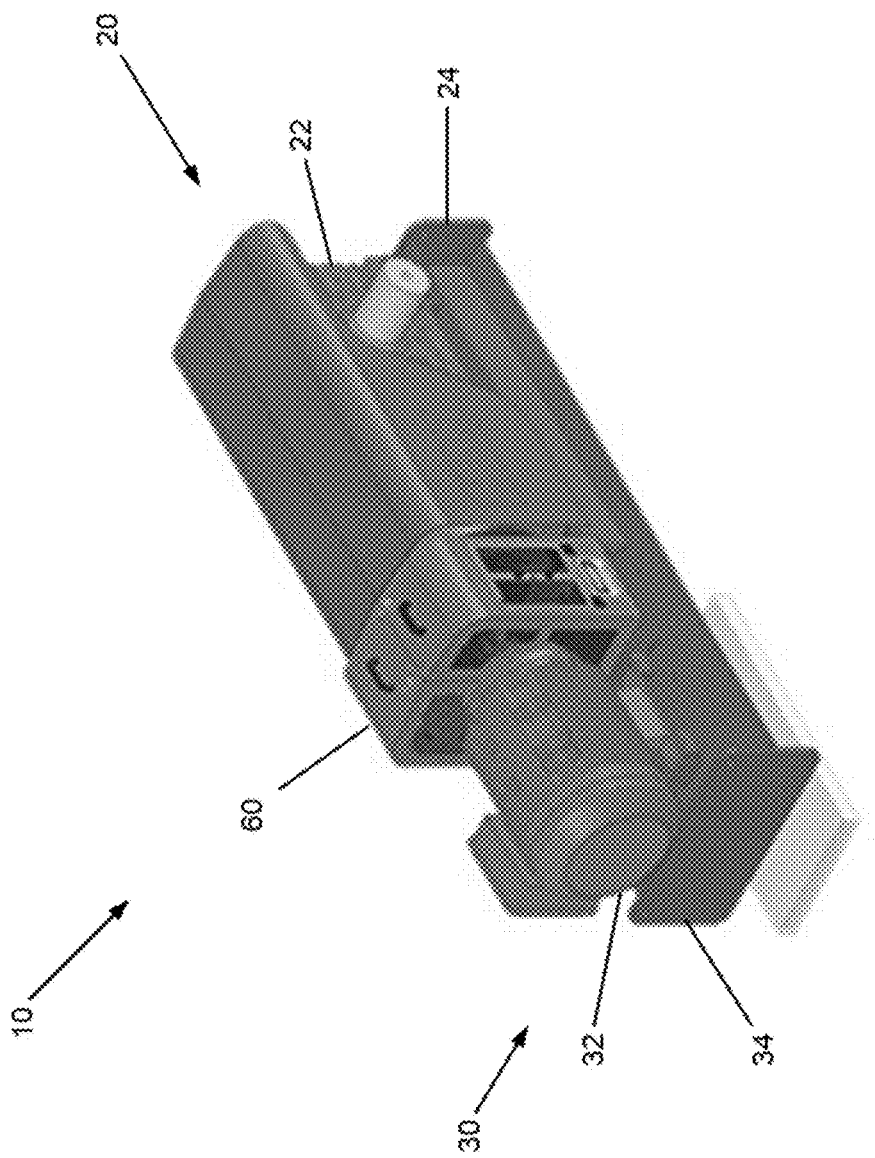

As schematically illustrated in the Figures, a standardized modular drive assembly 10 according to an exemplary embodiment of the present invention may generally include a gear unit module 20 and a motor module 30. Standardized modular drive assembly 10, for instance, may be an angle drive assembly for a belt-type conveyor.

Gear unit module 20 may include a gear unit 22, which is mounted on a gear unit base plate 24. Gear unit 22 may have a right-angled output shaft 26, which is adapted to be coupled with a conveyor device pulley shaft of the belt-type conveyor. Gear unit base plate 24 may include a torque arm holder 28, which is adapted to be coupled with a conveyor device support structure of the belt-type conveyer. Gear unit 22 may be a compact, single-stage gear unit 22 featuring standardized gear ratios. Suitable gear units 24 may be X3KR140, X3KR160, X3KR180, X3KR200 and X3KR220 gear units, which are able to be obtained from SEW-Eurodrive.

Motor module 30 may include an electric motor 32 mounted on a motor base plate 34. Motor base plate 34 is able to be joined and connected in an exchangeable manner to gear unit base plate 24. For example, by an at least partial overlap of a recessed, projecting part of gear unit base plate 24, motor base plate 34 may be joined and connected to gear unit base plate 24 in an exchangeable manner. Electric motor 32 may be a foot-mounted AC electric motor or a flange-mounted electric motor. Electric motor 32 may be an AC electric motor or a DC electric motor. Electric motor 32 is able to be defined by standardized dimensions and ranges of power, e.g., IEC- or NEMA-standardized dimensions and ranges of power.

Gear unit module 20 may be defined by standardized interface measurements L, W, H and D, in which case L represents a clearance between a vertical center line of torque arm holder 28 and a longitudinal center line of right-angled output shaft 26. W may represent a clearance between a longitudinal center line of gear unit 22 and an end face of right-angled output shaft 26. H may represent a clearance between a horizontal center line of an underside of gear unit base plate 24 and the longitudinal center line of right-angled output shaft 26. D may represent a diameter of right-angled output shaft 26.

Gear unit 22 is able to be selected from a plurality of gear units 22 which have a plurality of corresponding standardized gear ratios. The plurality of gear units 22 may be between two and ten different gear units 22, e.g., five gear units 22 that differ from one another.

In an analogous manner, electric motor 32 may be selected from a plurality of electric motors 32, which have a plurality of corresponding standardized dimensions and ranges of power. The plurality of electric motors 32 may be between two and ten different electric motors 32 such as six electric motors 32 that differ from one another.

In addition, standardized modular drive assembly 10 may include a brake 40, which is disposed between a drive shaft of electric motor 32 and an input shaft of gear unit 22. Brake 40 may be selected from a plurality of brakes 40 that have standardized dimensions and nominal values. The plurality of brakes 40 may be between two and ten different brakes 40 such as three brakes 40 that differ from one another. For example, brake 40 can be an electro-hydraulic brake or a hydraulic brake.

In addition, standardized modular drive assembly 10 may include a torque link 50, which is adapted to connect torque arm holder 28 of gear unit base plate 22 to the conveyor device support structure. Torque link 50 is able to be selected from a plurality of torque links 50 having standardized dimensions and nominal values. The plurality of torque links 50 may be between two and ten torque links 50 that differ from one another, e.g., three different torque links 50. For example, torque link 50 may be a Belleville spring or a torque arm.

Exemplary embodiments of the present invention may allow for a large number of possible standardized modular drive assemblies 10 to be produced from a small number of mounted gear unit base plates 22 and motor base plates 32. For example, up to 39 different configurations of standardized modular drive assemblies 10 are able to be produced, with five standardized gear unit modules 20, six standardized motor modules 30, three standardized brakes 40 and three standardized torque links 50 being provided. A standardization of functional modules of the standardized modular drive assemblies 10 may in turn allow for a standardization of other supplementary components such as protection devices 60. In addition, the standardized interface measurements L, W, H and D may enable a large number of possible standardized modular drive assemblies 10 for coupling with a wide range of different conveyor devices.

Example embodiments of the present invention provide standardized modular drive assemblies that may be used both in general and for driving industrial equipment such as conveyor devices, in particular. The standardized interface measurements, modular components and connections allow for a ready configuration of standardized modular drive assemblies for a multitude of different customer demands at a considerable reduction of the production costs and lead times in comparison with conventional customer-specific drive assemblies for conveyor devices.

In the present context, the term 'including' should be understood to mean 'having but not restricted thereto', and the term 'includes' should be understood to have a corresponding meaning.

The above embodiments have been described purely by way of example, and modifications are possible without departing from the scope and spirit hereof.

Figure 7:
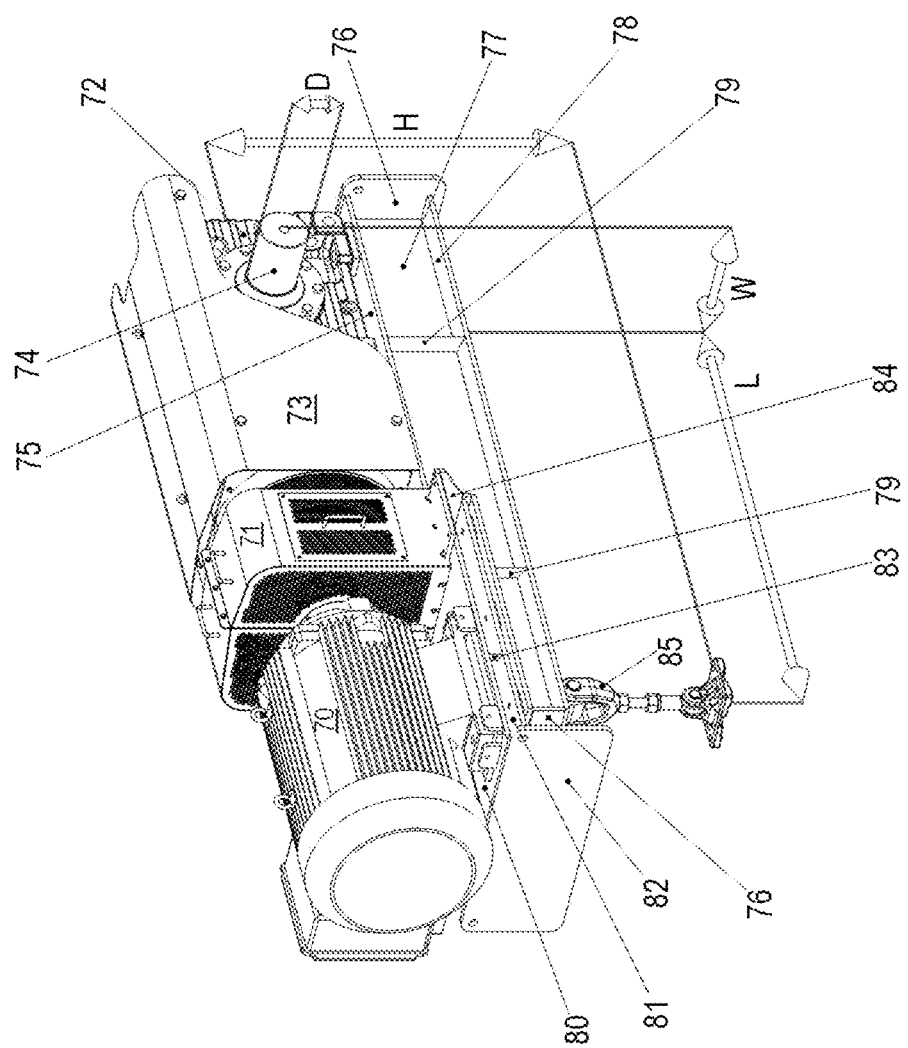
FIG. 7 is a perspective view of a further exemplary drive assembly.
Figure 8:
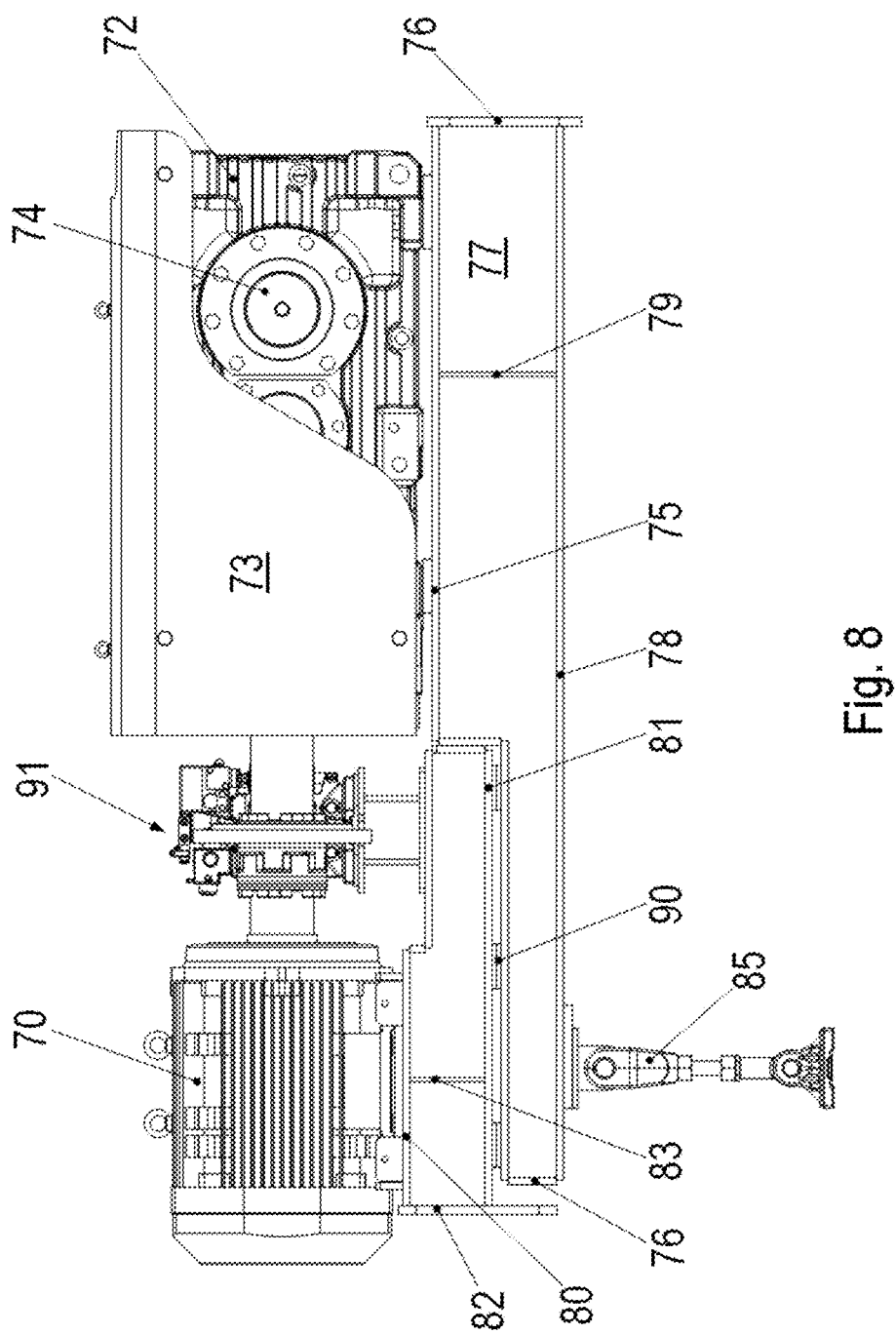
FIG. 8 is an associated side view with an unprotected coupling 91.
Figure 9:
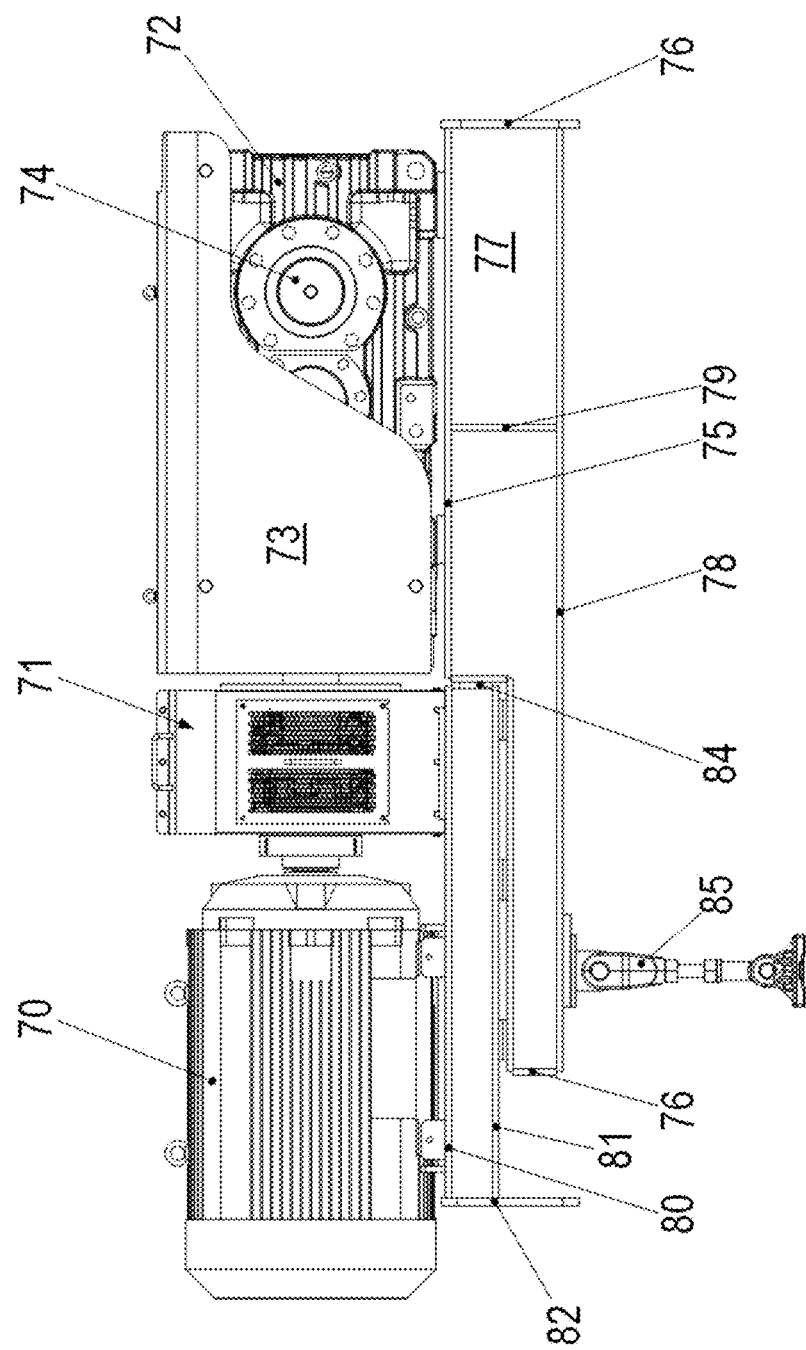
FIG. 9 is an associated side view with a protected coupling 91.
Figure 10:
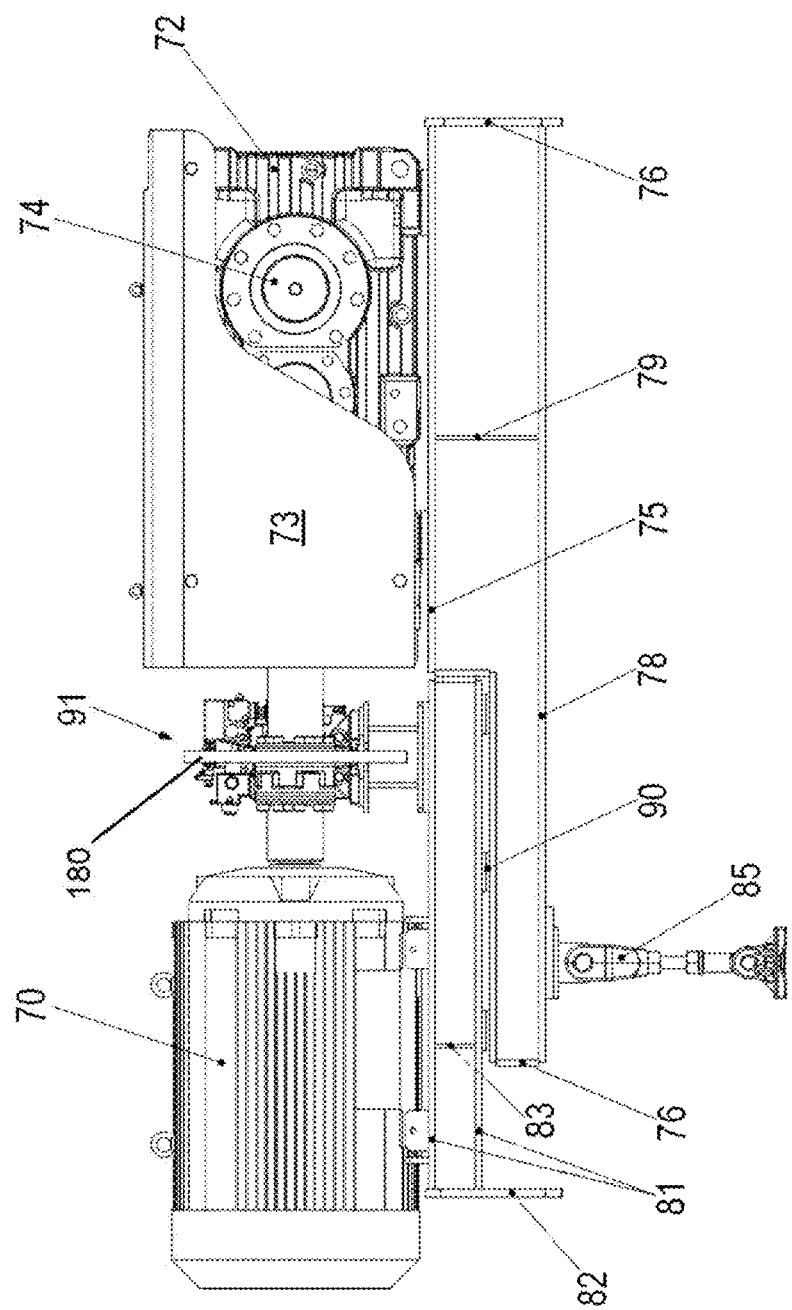
FIG. 10 is an associated side view with an unprotected coupling 91, in which a different motor 70 is used.
Figure 11:
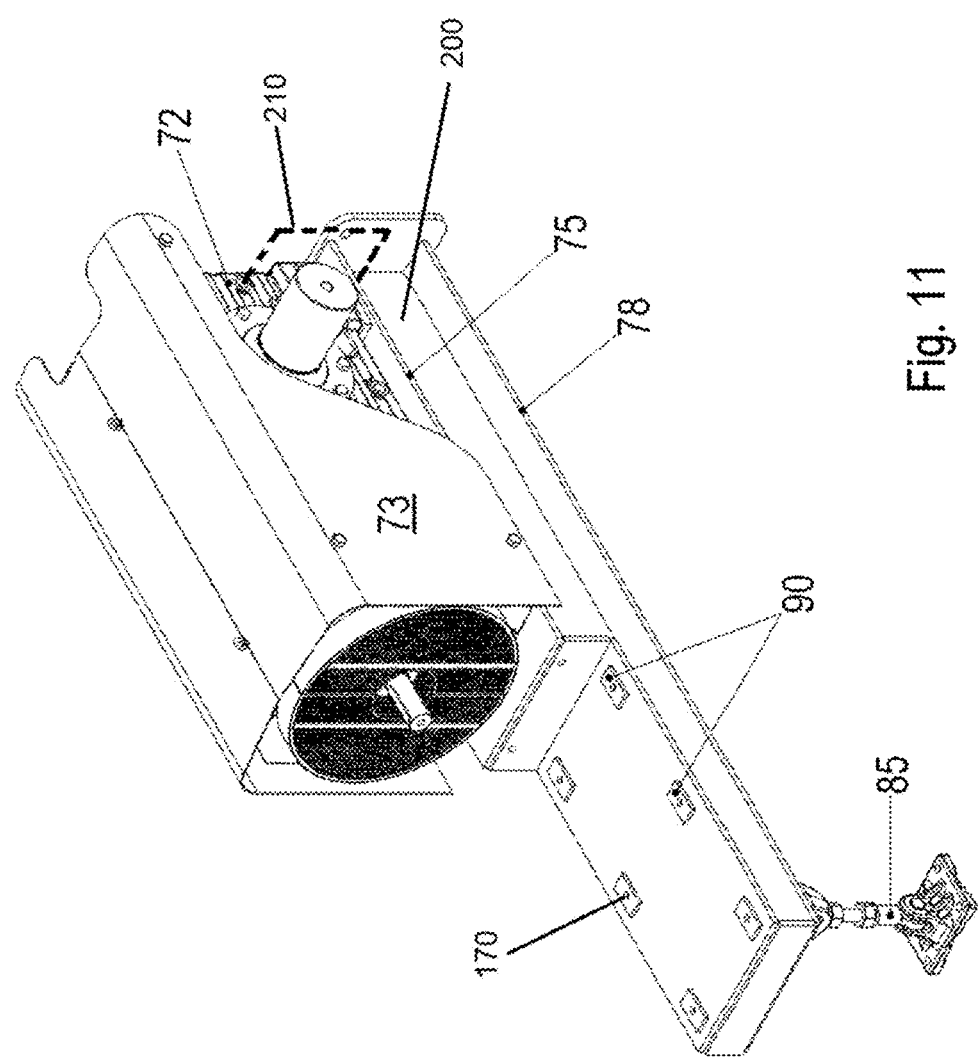
FIGS. 11 to 14 illustrate example embodiments of the present invention.
Figure 12:
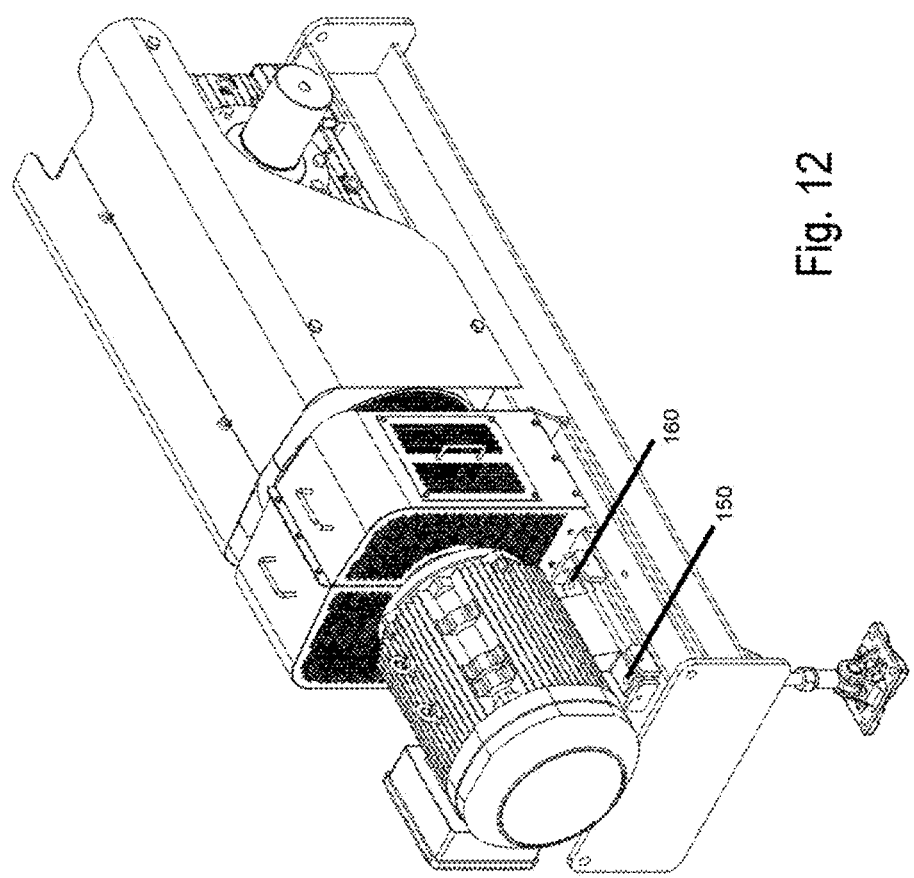
Figure 13:
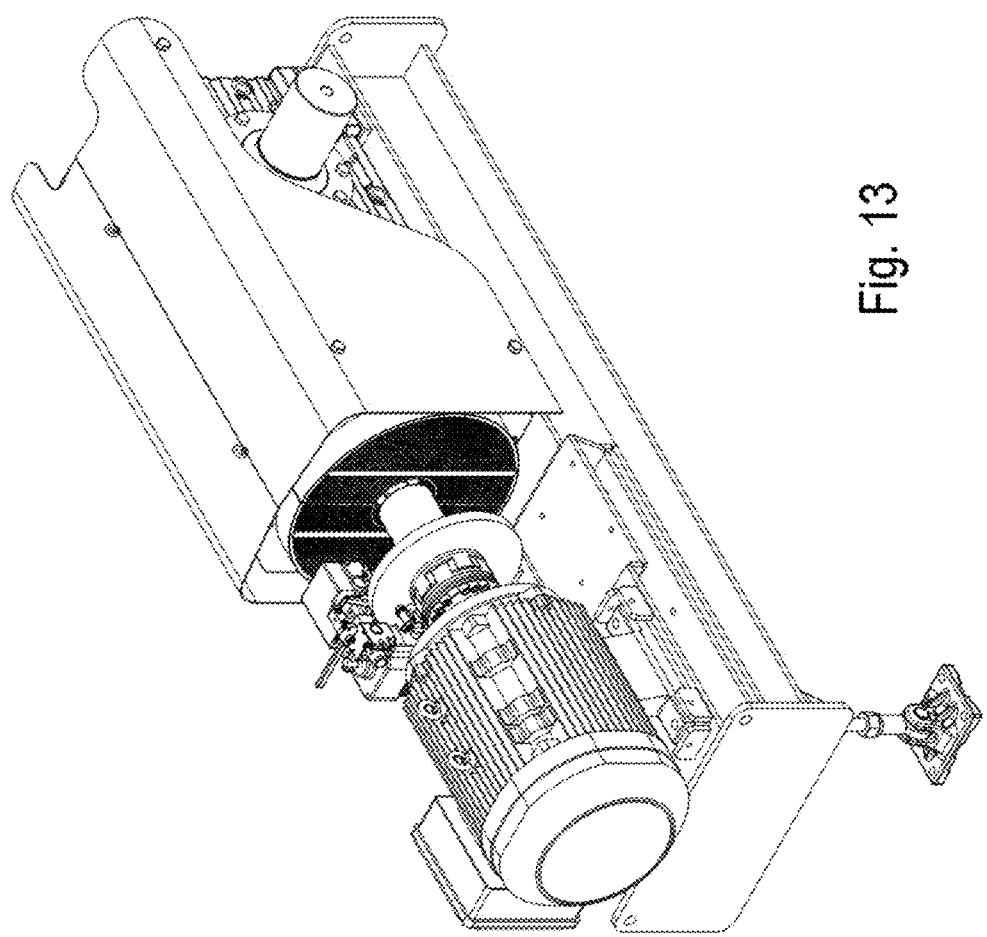

As illustrated in FIGS. 7 through 9, a motor 70, especially an electric motor, drives the input shaft of a gear unit 72 via a coupling 91, which is protected by a contact protection 71. As mentioned above, for example, an electrical insulator 180 is arranged between the coupling and the input shaft of the gear unit to electrically insulate the motor 70 and the gear unit 72. Output shaft 74 of gear unit 74 is aligned perpendicular to the input shaft because the input gear stage of gear unit 72 is an angle gear unit stage and the further gear stages are parallel shaft stages, i.e., spur gear stages.

A fan is connected to the input shaft in a torsionally fixed manner, and the airflow conveyed by the fan is guided from a fan cowl 73 along the surface of the housing of gear unit 72 so that efficient cooling is able to be achieved.

Motor 70 together with coupling 91 and gear unit 72 is situated on a motor swing base provided in two parts.

The motor swing base includes a first swing part and a second swing part.

Gear unit 72 is situated and fixed in place on the first swing part. The first swing part, which, for example, corresponds to gear unit base plate 24 according to FIGS. 1 through 6, is composed of an upper plate 75 and a lower plate 78. Upper plate 75 has a step, which connects two plate regions that are aligned in parallel with each other.

The first one of these two plate regions is arranged as an installation surface and connection surface for gear unit 72, and the second of these two plate regions is arranged as a connection surface to the second swing part, which, for example, corresponds to motor base plate 34 according to FIGS. 1 through 6.

A lower plate 78, which is set apart from upper plate 75, is aligned in parallel with upper plate 75, e.g., the two plate regions.

Situated between upper plate 75 and lower plate 78 is a support plate 77, which is connected, for example, by welding, both to upper plate 75 and to lower plate 78.

Support plate 77 is aligned perpendicular to upper plate 75 and lower plate 78.

For stiffening purposes, webs 79 are connected to support plate 77 and both to upper plate 75 and lower plate 78, for example, by welding.

For additional stiffening, front plates 76 are connected to support plate 77 and connected both to upper plate 75 and to lower plate 78, for example, by welding. Front plates 76 are perpendicularly aligned not only with support plate 77 but also with upper plate 75 and lower plate 78.

At the connection surface of the second plate region of the first swing part, spacer plates 90 are situated, which are fastened to the connection surface. Spacer plates 90 form a pattern of spacer plates 90 that are set apart from one another at regular intervals and are connected to this upper plate region, for example, by a welded connection.

A similar pattern of further spacer plates 90 is situated on the side of a lower plate 81 of motor base plate 34 facing the connection surface and connected to it, for example, by a welded connection.

With the aid of webs 83 and a further support plate, lower plate 81 of the second swing part is connected to upper plate 80 of the second swing part, front plates 82 and webs 83 each being connected both to lower plate 81 and to upper plate 80, for example, by welding.

Motor 70 is situated on the upper plate of the second swing part.

Spacer plates 90 are thus arranged as pairs in each case, a first spacer plate 90 of the respective pair resting against the other via upper plate 75 of the first swing part, and second spacer plate 90 of the respective pair resting against the other via lower plate 81 of the second swing part, and having an uninterrupted hole directed in the normal direction of the planar connection surface, through which a screw or a threaded rod is guided in order to connect the two swing parts. As mentioned above, a connector 150 such as a threaded rod or screw projects through a recess 170 that passes through the pair, e.g., such that a nut 160 and a screw head or a further nut 190 press the two swing parts onto the respective pair.

Via torque support 85, lower plate 78 of the second swing part is able to be connected to the floor of the system in which the drive assembly, e.g., the gear unit motor, is arranged. With the exception of the uninterrupted hole, each one of plate parts 90 has a cuboidal shape.

Figure 14:
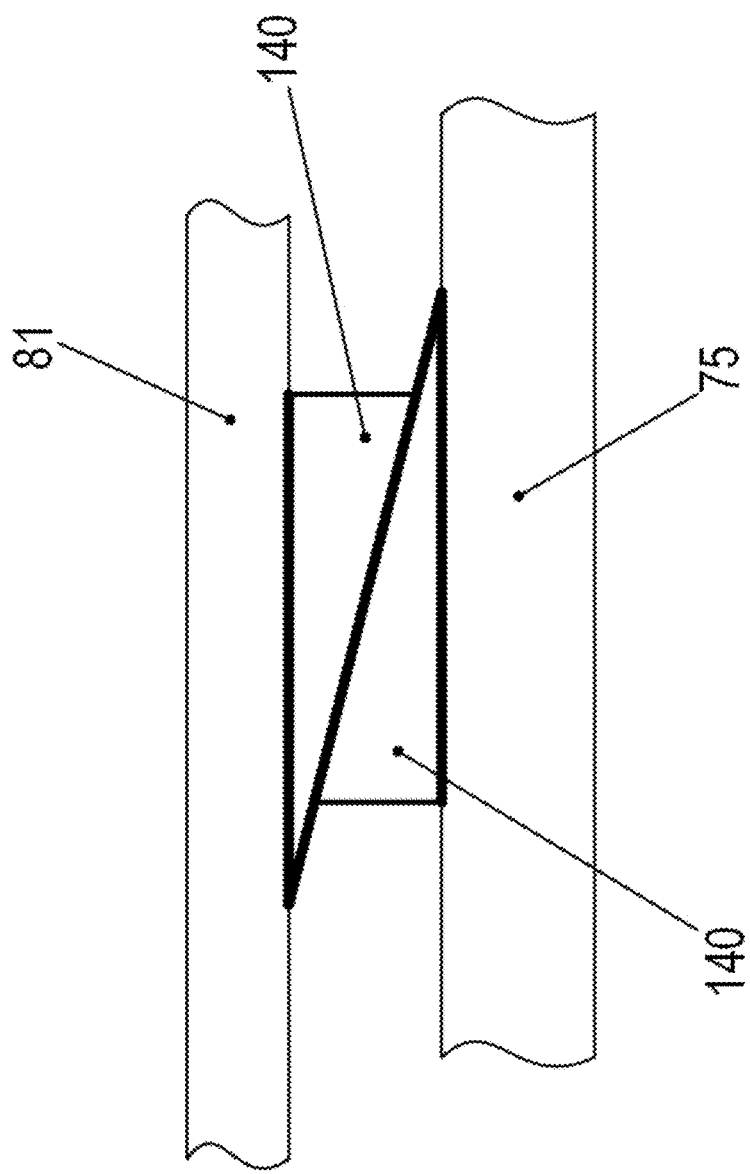

As illustrated in FIG. 14, wedge-shaped plate parts 140 including a bevel instead of cuboidal plate parts 90 are used in further exemplary embodiments and thus are arranged as a wedge, in particular. Each one of these plate parts 140 may have a trapezoidal cross-section. The sloping surfaces of the two plate parts 140 of a respective pair rest against each other so that the contact surfaces of both plate parts 140 are aligned in parallel with respect to lower plate 81 and upper plate 75, respectively.

By a displacement of the second swing part relative to the first swing part, the height is therefore adjustable, which means that no shim rings are required if sufficient axial clearance is provided when the input shaft of gear unit 72 is connected to coupling 91.

In further exemplary embodiments, the plate parts (90, 140) are adapted to be suitable for damping vibrations. Suitable for this purpose is also a configuration of the plate parts (90, 149) from a composite material. Each one of the plate parts (90, 140) may be formed from a stack of sheet metal, that is to say, from a stack of individual sheet metal pieces, each individual piece having at least one of its two sides coated, e.g., with a plastic coating or with a coating of some other elastic material.

It is also possible to place damping elements of a different configuration between the two swing parts. The bipartite arrangement of the motor swing base allows for the damping of specific vibration modes.

In further exemplary embodiments, the plate parts (90, 140) are arranged as a thermal barrier so that the heat flow generated by the motor is able to be spread out with the aid of the second swing part but is kept away from the first swing part. The first swing part has a cavity 200, which is arranged as an oil reservoir which is at least partially filled with transmission oil, and an oil line 210 leads from the cavity to the interior space of the gear unit, e.g., via a pump, and an oil line leads from the interior space of the gear unit to the cavity. As a result, the oil is able to be conveyed out of the gear unit into the first swing part during an operation, where it is able to be calmed, i.e., defoamed. In addition, the heat dissipates into the environment. The pump conveys the calmed and cooled oil back into the gear unit again and contributes to the cooling of the gear unit.

Because of the bipartite configuration of the motor swing base, the heat generated by the motor is able to be kept away from the first swing part. However, the second swing part is used for spreading the heat flow generated by the motor and improves the heat dissipation into the environment.

LIST OF REFERENCE NUMERALS 10 modular drive assembly
20 gear unit module
22 gear unit
24 gear unit base plate
26 output shaft
28 torque arm holder, in particular torque support
30 motor module
32 electric motor
34 motor base plate
40 brake
50 torque link
60 protection devices
70 motor, in particular electric motor
71 contact protection
72 gear unit
73 fan cowl
74 output shaft
75 upper plate of gear unit base plate 24
76 front plate
77 support plate
78 lower plate of the gear unit base plate 24
79 web
80 upper plate of motor base plate 34
81 lower plate of motor base plate 34
82 front plate
83 web
84 front plate
85 torque support
90 spacer plate
91 coupling
140 spacer plate, wedge-shaped
150 connector, threaded rod, screw
160 nut
170 recess
180 electrical insulator
190 screw head, further nut
200 cavity
210 oil line

The invention claimed is:

1. A drive assembly, comprising:
a clear unit module including a clear unit mounted on a clear unit base plate, the clear unit having an output shaft adapted to couple with a conveyor device pulley shaft;
a motor module including an electric motor mounted on a motor base plate, the motor base plate adapted to join and connect to the gear unit base plate in an exchangeable manner, the motor module including a torque link adapted to couple with a conveyor device support structure; and
a motor swing base including a first swing part and a second swing part, the clear unit being fixed in place on the first swing part, the motor being fixed in place on the second swing part;
wherein at least one pair of plate parts is arranged between the first swing part and the second swing part, a first plate part of the pair being connected and/or welded to the first swing part, a second plate part of the pair being connected and/or welded to the second swing part.

2. The drive assembly according to claim 1, wherein the drive assembly is arranged as a standardized drive assembly and/or as a modular drive assembly.

3. The drive assembly according to claim 1, wherein the drive assembly is defined by standardized interface measurements L, W, H and D, L representing a clearance between vertical planes perpendicular to a center of gravity line of the drive assembly through centers of the torque link and the output shaft, W representing a clearance between vertical planes perpendicular to a center of gravity line of the output shaft through the center of the torque link and an end face of the output shaft, H representing a clearance between vertical planes through the center of gravity line of the output shaft and a mounting surface of the torque link, and D representing a diameter of the output shaft of the gear unit.

4. The drive assembly according to claim 1, wherein (a) the gear unit corresponds to a selected one of a plurality of gear units having a plurality of corresponding standardized gear ratios, (b) the electric motor corresponds to a selected one of a plurality of electric motors having a plurality of corresponding standardized dimensions, (c) the drive assembly includes a brake arranged between a drive shaft of the electric motor and an input shaft of the gear unit, and/or (d) the torque link corresponds to a selected one of a plurality of torque links having standardized dimensions.

5. The drive assembly according to claim 1, wherein (a) the motor module adapted to join and connect to the gear unit module in an exchangeable manner by partly overlapping, recessed, projecting parts of the gear unit base plate and the motor base plate and/or (b) the drive assembly is arranged as an angle drive system for a conveyor device.

6. The drive assembly according to claim 1, wherein the first swing part includes and/or is arranged as the gear unit base plate, and the second swing part includes and/or is arranged as the motor base plate.

7. The drive assembly according to claim 1, wherein the motor is adapted to drive the gear unit (a) directly and/or (b) via a coupling.

8. The drive assembly according to claim 1, wherein a surface of a respective first plate part facing a respective second plate part being arranged in: (a) common plane; and (b) a common plane machined by a cutting tool.

9. The drive assembly according to claim 1, wherein a connector, a threaded rod, and/or a screw projects through a recess that passes through the pair.

10. The drive assembly according to claim 9, wherein a nut, a screw head, and/or a further nut presses the two swing parts onto the respective pair.

11. The drive assembly according to claim 1, wherein each of the plate parts is cuboid-shaped and/or wedge-shaped.

12. The drive assembly according to claim 11, wherein each of the plate parts is cuboid-shaped to form a plane machinable by a cutting tool and/or wedge-shaped for height adjustment by a relative planar displacement of the two swing parts with respect to each other.

13. The drive assembly according to claim 1, wherein the plate parts are arranged as damping device adapted to damp vibrations and/or include a stack of sheet metal coated with an elastic material.

14. The drive assembly according to claim 1, wherein the plate parts are arranged as electric insulators electrically insulating the first swing part from the second swing part.

15. The drive assembly according to claim 14, wherein an electrical insulator is arranged between a coupling and an input shaft of the gear unit to electrically insulate the motor and the gear unit.

16. The drive assembly according to claim 14, wherein the plate parts are formed of an electrically insulating material and/or having a coating made from an electrically insulating material.

17. The drive assembly according to claim 1, wherein a region covered by the first swing part in an axial direction overlaps with and/or is encompassed by a region covered by the second swing part in the axial direction or is encompassed, a region covered by the first swing part in a normal direction overlaps with and/or is encompassed by a region covered by the second swing part in the normal direction, the axial direction being parallel to an axis of rotation of a rotor shaft of the motor and/or parallel to an axis of rotation of an input shaft of the gear unit, the normal direction being aligned in parallel with a normal of a plane that includes the pairs of plate parts and/or being aligned in parallel with a normal of a plane that includes a contact surface between the first plate part and the second plate part of a respective pair.

18. The drive assembly according to claim 1, wherein the first swing part includes a cavity at least partially filled with transmission oil, and an oil line leads from the cavity to an interior space of the gear unit, via a pump, and an oil line leads from the interior space of the gear unit to the cavity, the plate parts being arranged as a thermal barrier so that the heat flow generated by the motor is spread out by the second swing part but is kept away from the first swing part.

19. A conveyor device, comprising a drive assembly as recited in claim 1.

20. A drive assembly, comprising:
a gear unit module including a gear unit mounted on a gear unit base plate, the near unit having an output shaft adapted to couple with a conveyor device pulley shaft;
a motor module including an electric motor mounted on a motor base plate, the motor base plate adapted to loin and connect to the clear unit base plate in an exchangeable manner, the motor module including a torque link adapted to couple with a conveyor device support structure; and
a motor swing base including a first swing part and a second swing part, the gear unit being fixed in place on the first swing part, the motor being fixed in place on the second swing part;
wherein the first swing part is supported by a torque support supported on a floor and contacts and supports the first swing part in a region covered by the second swing part in an axial direction, the drive assembly being carried and/or held solely via the torque support and the output shaft.

21. A drive assembly, comprising:
- a gear unit module including a near unit mounted on a gear unit base plate, the near unit having an output shaft adapted to couple with a conveyor device pulley shaft;
- a motor module including an electric motor mounted on a motor base plate, the motor base plate adapted to join and connect to the gear unit base plate in an exchangeable manner, the motor module including a torque link adapted to couple with a conveyor device support structure; and
- a motor swing base including a first swing part and a second swing part, the gear unit being fixed in place on the first swing part, the motor being fixed in place on the second swing part;

wherein the first swing part includes an upper plate and a lower plate aligned in parallel with the upper plate and set apart from the upper plate, a support plate is arranged between the upper plate and the lower plate, the support plate is connected and/or welded to the upper plate and the lower plate, front plates and/or webs being connected and/or welded to the upper plate, the lower plate, and the support plate.

22. The drive assembly according to claim 21, wherein the second swing part includes an upper plate and a lower plate aligned in parallel with the upper plate and set apart from the upper plate, a support plate is arranged between the upper plate and the lower plate, the support plate is connected and/or welded to the upper plate and the lower plate, the front plates and/or the webs being connected and/or welded to the upper plate, the lower plate, and the support plate in each case.

* * * * *